US012587459B2

(12) United States Patent
Katrak et al.

(10) Patent No.: US 12,587,459 B2
(45) Date of Patent: Mar. 24, 2026

(54) METHOD FOR DYNAMIC MULTIHOMING FOR RELIABLE DATA TRANSMISSION

(71) Applicant: Fort Robotics, Inc., Philadelphia, PA (US)

(72) Inventors: Kerfegar Khurshed Katrak, Fenton, MI (US); Nathan Bivans, Cinnaminson, NJ (US)

(73) Assignee: Fort Robotics, Inc., Philadelphia, PA (US)

( * ) Notice: Subject to any disclaimer, the term of this patent is extended or adjusted under 35 U.S.C. 154(b) by 373 days.

(21) Appl. No.: 18/144,687

(22) Filed: May 8, 2023

(65) Prior Publication Data

US 2023/0359160 A1    Nov. 9, 2023

Related U.S. Application Data

(63) Continuation-in-part of application No. 18/125,034, filed on Mar. 22, 2023, now abandoned, which is a
(Continued)

(51) Int. Cl.
*H04L 43/08* (2022.01)
*H04L 45/00* (2022.01)

(52) U.S. Cl.
CPC .... *H04L 43/08* (2013.01); *G05B 2219/24024* (2013.01); *G05B 2219/25257* (2013.01); *H04L 45/22* (2013.01)

(58) Field of Classification Search
CPC . H04L 43/08; H04L 43/0823; H04L 43/0852; H04L 43/16; H04L 45/22;
(Continued)

(56) References Cited

U.S. PATENT DOCUMENTS

| | | | |
|---|---|---|---|
| 5,974,529 | A | 10/1999 | Zumkehr et al. |
| 10,588,069 | B1 | 3/2020 | Chen et al. |

(Continued)

FOREIGN PATENT DOCUMENTS

| | | |
|---|---|---|
| JP | 2007528160 A | 10/2007 |
| JP | 2010088120 A | 4/2010 |

(Continued)

OTHER PUBLICATIONS

Final Office Action for U.S. Appl. No. 17/192,657 dated Jun. 30, 2023.
(Continued)

*Primary Examiner* — Jungwon Chang
(74) *Attorney, Agent, or Firm* — Run8 Patent Group, LLC; Peter Miller; Brian T. Chew

(57) ABSTRACT

A method includes: accessing first data in a data stream, the first data including an encoded value representing a safety state of an emergency stop device; classifying the data stream into a first data class based on the encoded value; accessing a policy, associated with the first data class, defining first target conditions; selecting a first communication link as a first active communication link for the data stream, the first communication link exhibiting first conditions corresponding to the first target conditions; transmitting the first data via the first communication link; in response to detecting a difference between the first conditions and the first target conditions, selecting a second communication link as a second active communication link for the first data stream, the second communication link exhibiting second conditions corresponding to the first target conditions; and transmitting second data in the data stream via the second communication link.

20 Claims, 4 Drawing Sheets

Related U.S. Application Data continuation of application No. 17/332,652, filed on May 27, 2021, now abandoned, and a continuation-in-part of application No. 17/326,878, filed on May 21, 2021, now abandoned.

(60) Provisional application No. 63/028,291, filed on May 21, 2020.

(58) Field of Classification Search
CPC ............ G05B 2219/24024; G05B 9/03; G05B 2219/25257
USPC ......................................................... 370/392
See application file for complete search history.

(56) References Cited

U.S. PATENT DOCUMENTS

| | | | |
|---|---|---|---|
| 11,086,336 B1 | 8/2021 | Bolotski et al. | |
| 2004/0008467 A1* | 1/2004 | Calandre .............. | G05B 19/042 |
| | | | 361/119 |
| 2004/0015691 A1 | 1/2004 | Collette et al. | |
| 2004/0078116 A1* | 4/2004 | Hashimoto .............. | G05B 9/03 |
| | | | 700/264 |
| 2005/0091501 A1 | 4/2005 | Osthoff et al. | |
| 2005/0174935 A1 | 8/2005 | Segel | |
| 2007/0159977 A1 | 7/2007 | Dalal et al. | |
| 2007/0160083 A1 | 7/2007 | Un et al. | |
| 2007/0230627 A1 | 10/2007 | Veen et al. | |
| 2010/0097952 A1 | 4/2010 | McHenry et al. | |
| 2011/0213984 A1 | 9/2011 | Orlando et al. | |
| 2011/0252144 A1 | 10/2011 | Tung et al. | |
| 2012/0082057 A1 | 4/2012 | Welin et al. | |
| 2013/0094509 A1* | 4/2013 | Chen ..................... | H04W 88/04 |
| | | | 370/392 |
| 2014/0108896 A1 | 4/2014 | Jung | |
| 2014/0350725 A1 | 11/2014 | LaFary et al. | |
| 2014/0372758 A1 | 12/2014 | Agiwal et al. | |
| 2016/0080280 A1 | 3/2016 | Ramachandran et al. | |
| 2016/0127187 A1 | 5/2016 | Chen et al. | |
| 2017/0070381 A1* | 3/2017 | Chellappan ........... | H04L 69/323 |
| 2018/0219765 A1 | 8/2018 | Michael et al. | |
| 2018/0238490 A1 | 8/2018 | Hahn et al. | |
| 2019/0033358 A1 | 1/2019 | Katrak | |
| 2019/0378610 A1 | 12/2019 | Barral et al. | |
| 2020/0035087 A1 | 1/2020 | Teki et al. | |
| 2020/0167470 A1 | 5/2020 | Kochura et al. | |
| 2020/0252162 A1 | 8/2020 | DenBoer et al. | |
| 2021/0105250 A1 | 4/2021 | Grinius et al. | |
| 2021/0105346 A1 | 4/2021 | Pandey | |
| 2021/0173961 A1 | 6/2021 | Young et al. | |
| 2021/0282117 A1* | 9/2021 | Bivans .................. | H04L 9/0891 |

FOREIGN PATENT DOCUMENTS

| | | |
|---|---|---|
| JP | 2016007042 A | 1/2016 |
| JP | 2017022433 A | 1/2017 |
| WO | 2007115272 A1 | 10/2007 |
| WO | 2018144560 A1 | 8/2018 |

OTHER PUBLICATIONS

Final Office Action for U.S. Appl. No. 17/326,878 dated Jun. 27, 2022.

Final Office Action for U.S. Appl. No. 17/326,878 dated Nov. 8, 2022.

International Search Report for International Application No. PCT/US21/20911 dated Jun. 1, 2021.

ISR received in PCT/US21/33565 dated Aug. 16, 2021.

Non-Final Office Action for U.S. Appl. No. 17/192,657 dated Oct. 27, 2022.

Non-Final Office Action for U.S. Appl. No. 17/332,652 dated Sep. 22, 2022.

Office Action received in JP Application No. 2022-552764 dated Mar. 7, 2023.

\* cited by examiner

METHOD FOR DYNAMIC MULTIHOMING FOR RELIABLE DATA TRANSMISSION

CROSS-REFERENCE TO RELATED APPLICATIONS

This application is a continuation-in-part application of U.S. patent application Ser. No. 18/125,034, filed on 22 Mar. 2023, which is a continuation application of U.S. patent application Ser. No. 17/332,652, filed on 27 May 2021, each of which is incorporated in its entirety by this reference.

This application is a continuation-in-part application of U.S. patent application Ser. No. 17/326,878, filed on 21 May 2021, which claims the benefit of U.S. Provisional Application No. 63/028,291, filed on 21 May 2020, each of which is incorporated in its entirety by this reference.

This application is related to U.S. patent application Ser. No. 17/192,657, filed on 4 Mar. 2021, which is incorporated in its entirety by this reference.

TECHNICAL FIELD

This invention relates generally to the field of communications and more specifically to a new and useful method for dynamic multihoming for reliable data transmission within the field of communications.

DESCRIPTION OF THE EMBODIMENTS

Figure 1:
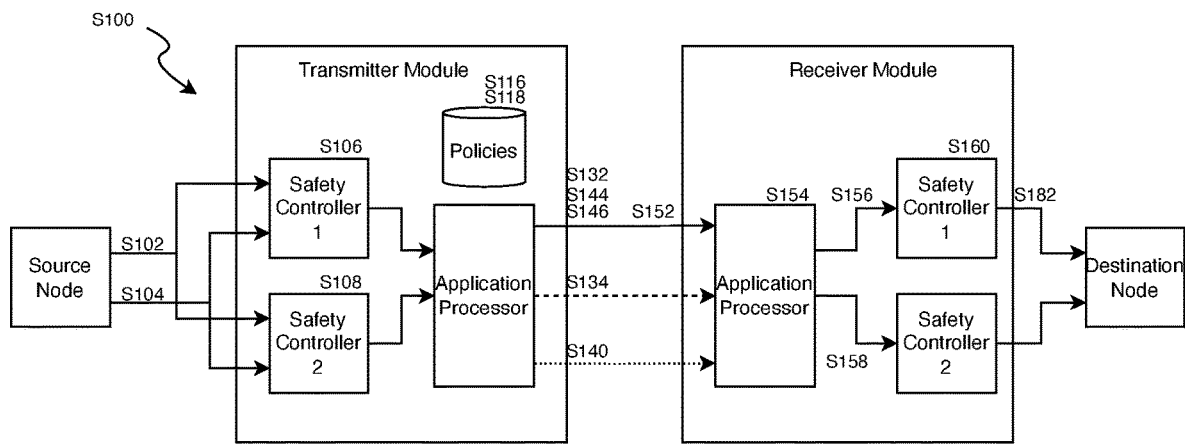
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1-6, a method S100 includes, during a first time period, at a first communications module: accessing a first set of data in a first data stream in Block S102, the first set of data including first safety state information associated with a first node; in response to detecting the first safety state information, classifying the first data stream into a first data class in a set of data classes in Block S112; in response to accessing a second set of data in a second data stream, classifying the second data stream into a second data class in the set of data classes in Block S114; accessing a first policy, in a set of policies, associated with the first data class in Block S116, the first policy defining a first set of target conditions including a latency falling below a first threshold; accessing a second policy, in the set of policies, associated with the second data class in Block S118, the second policy defining a second set of target conditions including a latency falling below a second threshold, the second threshold exceeding the first threshold; selecting a subset of communication links, in a set of communication links between the first communications module and a second communications module, corresponding to the first set of target conditions and the second set of target conditions in Block S130; and transmitting the first set of data and the second set of data via a first communication link in the subset of communication links in Blocks S144 and S146, the first communication link exhibiting a first latency falling below the first threshold.

The method S100 further includes, during the first time period, at the second communications module: in response to receiving the first set of data, validating the first safety state information as a first validated safety state in Block S160; and outputting the first validated safety state to a second node in Blocks S184 and S186.

The method S100 further includes, during a second time period succeeding the first time period, at the first communications module, in response to the first communication link exhibiting a second latency exceeding the first threshold and falling below the second threshold: transmitting a third set of data in the first data stream via a second communication link in the subset of communication links in Block S148, the second communication link exhibiting a third latency falling below the first threshold; and transmitting a fourth set of data in the second data stream via the first communication link in Block S146.

1.1 Variation: Safety Message Transmission & Validation

As shown in FIGS. 1-6, one variation of the method S100 includes: at a first controller of a first communications module, generating a first signal representing a first safety state of a first node in Block S106; and, at a second controller of the first communications module, generating a second signal representing the first safety state in Block S108.

This variation of the method S100 further includes, at a first processor of the first communications module: in response to accessing the first signal and the second signal, generating a first message including the first signal and the second signal in Block S110; classifying the first message into a first data class, in a set of data classes, based on the first signal and the second signal in Block S112; accessing a first policy, in a set of policies, associated with the first data class in Block S116, the first policy defining a first set of target conditions including an error rate falling below a first threshold; selecting a subset of communication links, in a set of communication links between the first communications module and a second communications module, corresponding to the first set of target conditions in Block S130; and transmitting the first message via a first communication link in the subset of communication links in Block S144, the first communication link exhibiting a first error rate falling below the first threshold.

This variation of the method S100 further includes, at a second processor of the second communications module: in response to receiving the first message, separating the first signal and the second signal in Block S154; outputting the first signal to a third controller of the second communications module in Block S156; and outputting the second signal to a fourth controller of the second communications module in Block S158.

This variation of the method S100 further includes, at the third controller: detecting a first ternary state of the first node based on the first signal in Block S170; generating a third signal based on the first ternary state in Block S174; and outputting, to the fourth controller, the third signal as a first readback value in Block S176.

This variation of the method S100 further includes, at the fourth controller: detecting a second ternary state of the first node based on the second signal in Block S172; and, in response to detecting a match between the second ternary state and the first readback value, outputting, to a second node, a fourth signal representing the second ternary state in Block S186.

1.2 Variation: Safety Data Stream

As shown in FIGS. 1-6, one variation of the method S100 includes, during a first time period, at a processor: accessing a first set of data in a first data stream in Block S102, the first set of data including a first encoded value representing a first safety state of an emergency stop device; classifying the first data stream into a first data class, in a set of data classes, based on the first encoded value in Block S112; and, in response to accessing a second set of data in a second data stream, classifying the second data stream into a second data class, in the set of data classes, based on the second set of data in Block S114; accessing a set of policies in Blocks S116 and S118. The set of policies can include: a first policy associated with the first data class, the first policy defining a first set of target conditions; and a second policy associated with the second data class, the second policy defining a second set of target conditions.

This variation of the method S100 further includes, during the first time period, at the processor: selecting a first communication link, in a set of communication links, as a first active communication link for the first data stream and the second data stream in Block S132, the first communication link exhibiting a first set of conditions corresponding to the first set of target conditions and the second set of target conditions; and transmitting the first set of data and the second set of data via the first communication link in Block S144.

This variation of the method S100 further includes, during a second time period succeeding the first time period, at the processor, in response to detecting a difference between the first set of conditions and the first set of target conditions: selecting a second communication link, in the set of communication links, as a second active communication link for the first data stream in Block S136, the second communication link exhibiting a second set of conditions corresponding to the first set of conditions; and transmitting a third set of data in the first data stream via the second communication link in Block S148, the third set of data including a second encoded value representing a second safety state of the emergency stop device.

This variation of the method S100 further includes, in response to detecting the first set of conditions corresponding to the second set of target conditions, transmitting a fourth set of data in the second data stream via the first communication link in Block S146.

2. Applications

Generally, Blocks of the method S100 can be executed by a computer system (hereinafter "the system"), including a transmitter module and a receiver module: to access a data stream from a source node (e.g., sensor, machine, robot, emergency stop button) communicatively coupled to the transmitter module; to classify the data stream into a data class; to access a policy for the data class and defining target conditions (e.g., target latency, target error rate) for transmitting the data stream; to select a first communication link—between the transmitter module and the receiver module—corresponding to the target conditions; to transmit data in the data stream via the first communication link; to later detect a difference between a set of conditions exhibited by the first communication link and the set of target conditions (e.g., degradation in link quality), such as due to increased network congestion, increased physical distance between the transmitter module and the receiver module, etc.; and to transition the data stream from the first communication link to a second communication link corresponding to the set of target conditions.

Accordingly, Blocks of the method S100 can be executed by the system: to monitor and generate metrics for a set of communication links available to transmit the data stream; to dynamically select a communication link—as a selected communication link—in the set of communication links based on these metrics; to transmit the data stream from the transmitter module to the receiver module via the selected communication link; and to output received data in the data stream to a destination node (e.g., vehicle, machine, robot, emergency stop base station) communicatively coupled to the receiver module. Therefore, the system can communicate an uninterrupted data stream through a dynamically selected communication link that is a best fit for the data stream according to performance, power efficiency, and/or monetary cost, etc. while maintaining service level requirements.

2.1 Safety Critical Data Stream

More specifically, Blocks of the method S100 can be executed by the system: to access the data stream including safety state information of the source node; to generate a message including redundant signals representing the safety state information and exhibiting variable encoding; to classify the message and/or the data stream into a safety critical data class based on the redundant signals; to access a policy for the safety critical data class and defining target conditions (e.g., latency falling below first threshold, error rate falling below second threshold) for transmitting the message; to select the first communication link exhibiting a latency falling below the first threshold and an error rate falling below the second threshold; to transmit the message via the first communication link; to validate the safety state information—as a validated safety state—in response to receiving the message; and to output the validated safety state to the destination node.

Accordingly, Blocks of the method S100 can be executed by the system to: select a communication link exhibiting metrics corresponding to the set of target conditions (e.g., requirements) of the data stream containing safety-critical data. Therefore, the system can meet functional safety standards in error reduction and latency requirements, thereby mitigating safety and/or security vulnerabilities that may lead to operational downtime, intellectual property theft, destruction of work product, human injury, and/or death.

Furthermore, Blocks of the method S100 can be executed by the system: to decode the redundant signals—representing the safety state information—as decoded signals; to detect a ternary state of the source node based on the decoded signals; and, in response to verifying the ternary state based on readback signals, to output the ternary state to the destination node.

Accordingly, Blocks of the method S100 can be executed by the system to implement different encoding schemes—exhibiting a minimum hamming distance(s) (e.g., 4, 8, 16) from each other—to generate the redundant signals. Therefore, the system can detect interference, bit flips, and/or software overwrites of data within these redundant signals.

2.2 Example

In one example implementation, Blocks of the method S100 are executed by the system: to access a first data stream, including emergency stop information, from a first robot; to classify the first data stream into a safety critical data class based on the emergency stop information; and to access a first policy, for the safety critical data class, defining a first set of target conditions—including a target operating frequency within a first range—for transmitting the first data stream.

In this example implementation, Blocks of the method S100 are executed by the system: to access a second data stream, including heartbeat information, from the first robot; to classify the second data stream into an informational data class based on the heartbeat information; and to access a second policy, for the informational data class, defining a second set of target conditions—including a target signal strength exceeding a second threshold—for transmitting the second data stream.

In this example implementation, Blocks of the method S100 are executed by the system, during a first time period: to select, for the first data stream, an Industrial, Scientific, Medical (ISM) communication link—between a transmitter module communicatively coupled to the first robot and a receiver module communication coupled to a second robot—exhibiting a first operating frequency within the first range; to select, for the second data stream, a Wi-Fi communication link, between the transmitter module and the receiver module, exhibiting a first signal strength exceeding the second threshold and exhibiting a first power efficiency; to transmit data in the first data stream via the ISM communication link; to transmit data in the second data stream via the Wi-Fi communication link; and to output this data received via the Wi-Fi communication link to the second robot.

In this example implementation, Blocks of the method S100 are executed by the system, during a second time period succeeding the first time period: to detect the Wi-Fi communication link exhibiting a second signal strength falling below the second threshold (due to the first robot and/or the second robot moving out of range of a Wi-Fi portal); and to transition the second data stream from the Wi-Fi communication link to a Long Term Evolution (LTE) communication link exhibiting a third signal strength exceeding the second threshold and exhibiting a second power efficiency falling below the first power efficiency exhibited by the Wi-Fi communication link.

Accordingly, Blocks of the method S100 can be executed by the system: to initially select the Wi-Fi communication link for transmitting the second data stream based on the Wi-Fi communication link exhibiting a greater power efficiency than the LTE communication link; and to transition the second data stream to the LTE communication link in response to detecting a loss of signal strength in the Wi-Fi communication link. Therefore, the system can leverage multiple communication links, exhibiting characteristics that vary due to changes in the system, to optimally communicate various data streams according to functional safety requirements and/or quality of service requirements of these data streams.

2.3 Node-to-Node Communication Links

The method S100 as described herein is executed by the system to select a communication link(s)—between a transmitter module and a receive module—for transmitting data in a data stream. However, the system can similarly execute Blocks of the method S100: to monitor and generate metrics for a set of communication links—between the source node and the destination node—available to transmit the data stream; to dynamically select (e.g., transition) a communication link—as a selected communication link—in the set of communication links based on these metrics; and to transmit the data stream via the selected communication link.

3. System

Generally, as shown in FIG. 1, a system can include a first node, a first communications module communicatively coupled to the first node, a communication network, a second node, and a second communications module communicatively coupled to the second node. The system can include additional nodes and/or communications modules communicatively coupled thereto.

In one implementation, the system can include: the first device (or "source node") communicatively coupled to the first communications module (or "transmitter module"); and the second node (or "destination node") communicatively coupled to the second communications module (or "receiver module"). In this implementation, the source node can: generate data (e.g., safety state information, command data, control data, sensor data, status information) for the destination node; and transmit the data to the destination node via the transmitter module, the communication network, and the receiver module. More specifically, the source node can generate and output the data to the transmitter module, which can transmit a message—including the data—through the communication network. The receiver module can then receive the message and output the data to the destination node.

3.1 Nodes

Generally, a source node can include a device that generates and/or outputs data to a destination node, and a destination node can include a device that receives data and/or is a target for the data. The destination node can execute an action(s) based on the data (or an absence of data).

In one example, a source node can include an aerial drone that generates and outputs a series of heartbeat signals in a data stream to a destination node, such as a remote base station. More specifically, the aerial drone can generate and output a heartbeat signal to a first communications module (as a transmitter module), which generates and transmits a first message—including the heartbeat signal—over the communication network. A second communication module (as a receiver module) can receive and output the first message to the remote base station. In response to detecting the heartbeat signal within a threshold time period, the base station can continue monitoring for a subsequent heartbeat signal.

However, in response to detecting an absence of a heartbeat signal within the threshold time period, the remote base station (as a source node) can issue a safety message including a command for the aerial drone (as a destination node) to return to the remote base station. In particular, the remote base station can generate and output the message to the second communication module (as a transmitter module), which then generates and transmits a second message—including the command—over the communication network. The first communication module (as a receiver module) can receive and output the second message to the aerial drone, which can then return to the remote base station in response to detecting the command.

In another example, a node (e.g., source node, destination node) can include a sensor (e.g., radar sensor, LiDAR sensor, ultrasonic sensor, infrared camera), a machine, a robot, a computing platform (e.g., wearable device, embedded device, implanted device, medical computing device, mobile device, laptop, desktop, server), a vehicle (e.g., autonomous vehicle, semi-autonomous vehicle), a control system, an emergency stop system (e.g., line break sensor, emergency stop device, emergency stop base station) and/or an industrial system (e.g., manufacturing system, farming system, construction system, power system, transportation system, space system), etc.

In one implementation, a node can include a set of resources, such as a set of processors, volatile memory (e.g., random access memory or "RAM"), non-volatile memory (e.g., flash storage), an input/output interface, a set of network interfaces (e.g., wireless local area network interface, wired local area network interface, Bluetooth network interface), input devices (e.g., sensors, user interface), output devices (e.g., motor, actuator, hydraulic arm), etc.

3.2 Communications Modules

Generally, a communications module can perform safety critical diagnostics and control functions. For example, a communications module can include hardware and/or software that meet functional safety standards (e.g., IEC 61508, ISO 13849, ISO 26262).

Generally, a communications module can include a set of resources, such as a set of controllers and/or a set of processors, volatile memory (e.g., RAM), non-volatile memory (e.g., flash storage), a set of network interfaces (e.g., wireless local area network interface, wired local area network interface, Bluetooth network interface), and/or input/output interfaces. Additionally, the communications module can further include: firmware, an operating system (or kernel), a set of applications, and/or logic.

In one implementation, the communications module can include the set of resources including: a first controller (e.g., first safety controller); a second controller (e.g., second safety controller); a processor (e.g., application processor); and a communication bus. The communication bus can support two-way communication between the first controller and the second controller, two-way communication between the first controller and the processor, and two-way communication between the second controller and the processor.

In one implementation, the first controller can include: an arithmetic logic unit (hereinafter "ALU"); volatile memory (e.g., RAM); and non-volatile memory (e.g., flash storage). The ALU can execute arithmetic and logic operations based on computer instructions executed by the first controller. The RAM can temporarily store data retrieved from storage for performing calculations. The flash storage can store data and/or instructions that are programmed into the first controller. The first controller can further include an input/output interface, an internal bus, and/or an internal oscillator. The first controller can include fewer or additional components.

The second controller can include analogous (e.g., similar, identical) components as the first controller. For example, the first controller and the second controller can be redundant controllers, each including identical components.

Furthermore, the processor can include analogous (e.g., similar, identical) components as the first controller. The third controller can further include a network interface (or a set of network interfaces) for communication over the communication network.

3.3 Communication Network

Generally, the communication network can include any transmission medium (e.g., the Internet, wired communication channel, wireless communication channel) between the first communication module and the second communication module. In one example, the network can include a direct network connection between the first communication module and the second communication module. In another example, the network can include a set of interstitial relay devices (e.g., electronic relays, routers, gateways) between the first communication module and the second communication module.

4. Data Transmission

Generally, a first communications module (e.g., transmitter module) can: receive a set of data (e.g., safety information, status information, command data, input data) in a data stream from a source node; access a policy associated with the data stream; select a communication link—in a set of communication links between the source node and a destination node—based on the policy; and transmit the message over the communication network via the communication link to a second communication module (e.g., receiver module) communicatively coupled to the destination node. More specifically, the first communications module can: access the policy defining a set of target conditions (e.g., transmission latency, error rate, power consumption, monetary cost, signal strength); and select the communication link based on the communication link exhibiting a set of metrics corresponding to the set of target conditions.

Accordingly, because the transmitter module selects a communication link exhibiting metrics corresponding to the set of target conditions (e.g., requirements) of a data stream—such as a data stream containing safety-critical data—between a source node and a destination node, the system can meet functional safety standards, thereby mitigating safety and/or security vulnerabilities that may lead to operational downtime, intellectual property theft, destruction of work product, human injury, and/or death.

4.1 Data Streams

Block S102 of the method S100 recites accessing a first set of data in a first data stream, the first set of data including first safety state information associated with a first node.

In one implementation, in Blocks S102 and S104, the transmitter module can receive (or access) a set of data in a data stream from a source node. More specifically, the transmitter module can receive the set of data at a processor (e.g., application processor) of the transmitter module. Additionally or alternatively, the transmitter module can receive the set of data at a first redundant input of the first controller of the transmitter module (e.g., the first safety controller) and/or at a second redundant input of the second controller of the transmitter module (e.g., the second safety controller).

For example, during a first time period, the transmitter module can receive a first set of sensor data (e.g., analog value(s), digital value(s)) in a data stream from a sensor. The transmitter device can then receive a second set of data in the data stream from the sensor during a second time period succeeding the first time period.

4.1.1 Data Classes

Generally, the transmitter module can receive sets of data in a data stream from a source node, the data stream (or the sets of data) characterized by a particular data class in a set of data classes. The transmitter module can transmit the sets of data in the data stream to a receiver module communicatively coupled to a destination module. The receiver module can then output these sets of data to the destination node.

In one implementation, the transmitter module can receive, from a sender node, a data stream characterized by a first data class—in the set of data classes—representing a safety critical data class. For example, the transmitter module can receive a first data stream including safety state information representing a safe state of an emergency stop device commanding a set of machines in a factory to immediately stop operation, the first data stream characterized by the first data class.

In another implementation, the transmitter module can receive, from a source node, a data stream characterized by a second data class—in the set of data classes—representing a real-time command critical data class. For example, the transmitter module can receive a second data stream including a command to a robot to pour molten metal in a mold in response to detecting a temperature of the molten metal exceeding a threshold, the second data stream characterized by the second data class.

In another implementation, the transmitter module can receive, from a source node, a data stream characterized by a third data class—in the set of data classes—representing a command critical data class. For example, the transmitter module can receive a third data stream including non-real-time instructions to an agriculture robot to control humidity in a greenhouse according to detected temperature throughout a year, the third data stream characterized by the third data class.

In another implementation, the transmitter module can receive, from a source node, a data stream characterized by a fourth data class—in the set of data classes—representing an informational data class. For example, the transmitter module can receive a fourth data stream including status information representing a battery level of a machine, the fourth data stream characterized by the fourth data class.

4.2 Data Classification

Block S112 of the method S100 recites, in response to detecting the first safety state information, classifying the first data stream into a first data class in a set of data classes.

Block S114 of the method S100 recites, in response to accessing a second set of data in a second data stream, classifying the second data stream into a second data class in the set of data classes.

Figure 3:
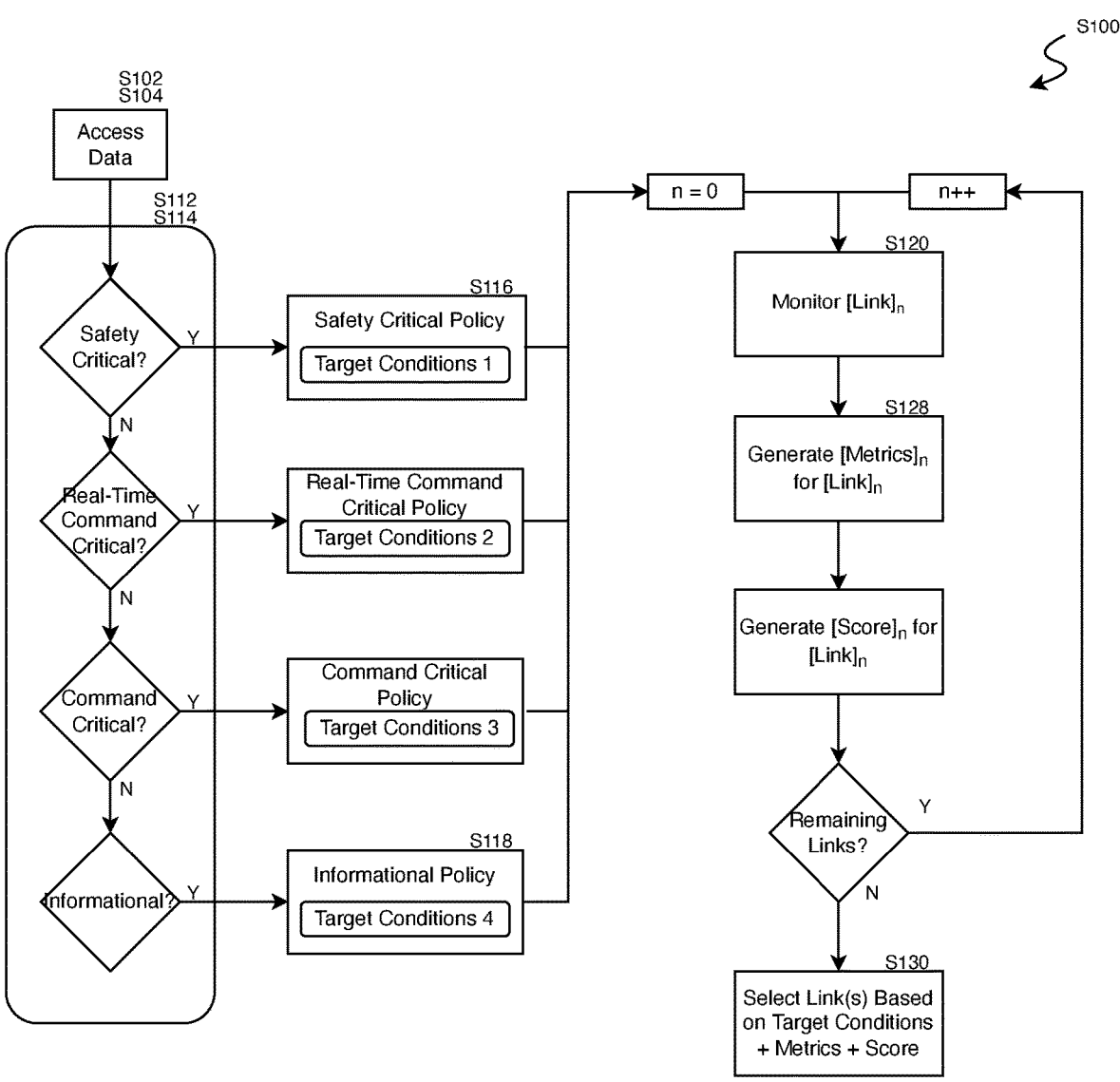
FIG. 3 is a flowchart representation of one variation of the method.

Generally, as shown in FIG. 3, the transmitter module can classify a set of data—in a data stream—into a particular data class in a set of data classes. Additionally or alternatively, the transmitter module can classify the data stream into the particular data class.

In one implementation, in Blocks S112 and S114, the transmitter module can classify a data stream into a data class based on a format of the data stream, content of the data stream, an indicator within the data stream, and/or other data from the source node outputting the data stream.

In one example, in response to receiving a first set of data in a first data stream from a first source node, the transmitter module can: detect safety state information within the first set of data; and classify the first data stream into a first data class—representing a safety critical data class—in a set of data classes based on the safety state information. More specifically, the transmitter module can: detect an encoded state indicator (or a set of encoded state indicators) representing a safety state of the first source node; and classify the first data stream into the first data class based on the encoded state indicator.

In another example, in response to receiving a second set of data in a second data stream from the first source node, the transmitter module can: detect a first heartbeat message—representing a status of the first source node—in the second set of data; and classify the second data stream into a third data class—representing a control critical data class—in the set of data classes based on the first heartbeat message. Alternatively, the transmitter module can classify the second data stream into a fourth data class—representing an informational data class—in the set of data classes based on the first heartbeat message.

Additionally or alternatively, the transmitter module can detect another indicator (e.g., flag, code, header) in a set of data in a data stream; and classify the data stream into a particular data class in the set of data classes based on the indicator.

In another implementation, the transmitter module can classify a data stream into a data class based on information associated with the source node and/or the destination node. In one example, the transmitter module can classify a data stream into a data class based on a first address of the source node and/or a second address of the destination node. In another example, the transmitter module can classify a data stream into a data class based on a first device type of the source node and/or a second device type of the destination node. In another example, the transmitter module can classify a data stream into a data class based on a first operating mode of the source node and/or a second operating mode of the destination node.

4.3 Policies

Blocks of the method S100 recite: accessing a first policy, in a set of policies, associated with the first data class in Block S116, the first policy defining a first set of target conditions including a latency falling below a first threshold; and accessing a second policy, in the set of policies, associated with the second data class in Block S118, the second policy defining a second set of target conditions including a latency falling below a second threshold, the second threshold exceeding the first threshold.

Generally, the transmitter module can access a policy for the data stream. More specifically, the transmitter module can access a policy defining a set of target conditions for communicating the data stream and/or messages containing data from the data stream.

In one implementation, in Blocks S116 and S118, the transmitter module can access a policy based on a data class of the data stream. More specifically, the transmitter module can identify a data class of the data stream based on a format of the data stream, content of the data stream, an indicator within the data stream, and/or other data from the source device outputting the data stream. The transmitter module can access a policy—in a set of policies—corresponding to the data class of the data stream.

In one example, in response to classifying a first data stream into a first data class (e.g., safety critical data class), the transmitter module can access a first policy—in a set of policies—corresponding to the first data class and defining a first set of target conditions associated with the first data class. In this example, the transmitter module can access the first policy defining the first set of target conditions including: a latency falling below a first latency threshold (e.g., 25 milliseconds), an error rate falling below a first error rate threshold (e.g., 0.001%), a signal strength exceeding a first signal strength threshold, a power consumption (e.g., power consumption per message) falling below a first power consumption threshold, a monetary cost (e.g., monetary cost per message) falling below a first monetary cost threshold, etc.

In another example, in response to classifying a second data stream into a second data class (e.g., control critical data class), the transmitter module can access a second policy—in the set of policies—corresponding to the second data class and defining a second set of target conditions associated with the second data class. In this example, the transmitter module can access the second policy defining the second set of target conditions including: a latency falling below a second latency threshold (e.g., 200 milliseconds), an error rate falling below a second error rate threshold (e.g., 1%), a signal strength exceeding a second signal strength threshold, a power consumption falling below a second power consumption threshold, a monetary cost falling below a second monetary cost threshold, etc.

In one implementation, the transmitter module can access a policy defining additional or alternative target conditions, such as system configuration, timing of a most recent interface change, link status, source authentication, destination authentication, encryption, a number of redundant frames, error correction code, variable encoding, etc.

4.4 Communications Links

Generally, a communications module can include a set of network interfaces for communicating data with other communications modules, nodes, devices, etc. The communications module can establish and maintain a set of communication links utilizing the set of network interfaces.

In one implementation, a first communications module can include a first set of network interfaces. The first communications module can establish and maintain a set of communication links with a second communications module—through the communication network—utilizing the first set of network interfaces. The first communications module can communicate (e.g., transmit, receive) data with the second communications module through the set of communication links (or a subset of communication links in the set of communication links).

In another implementation, the first communications module (and the second communications module) can establish and maintain this set of communication links utilizing a set of communications technologies and/or protocols, such as: Ethernet; 802.11; worldwide interoperability for microwave access (WiMAX); 3G; 4G; 5G; long term evolution (LTE); digital subscriber line (DSL); asynchronous transfer mode (ATM); InfiniBand; PCI Express Advanced Switching; Bluetooth; near field communication (NFC); Industrial, Scientific, Medical (ISM); radio; multiprotocol label switching (MPLS); the transmission control protocol/Internet protocol (TCP/IP); the User Datagram Protocol (UDP); the hypertext transport protocol (HTTP); the simple mail transfer protocol (SMTP); and/or the file transfer protocol (FTP); etc.

In one example, the first communications module can include a Wi-Fi network interface and an LTE interface. In this example, utilizing these network interfaces, the first communications module can establish—with the second communications module—a Wi-Fi communication link and an LTE communication link. The first communications module can then transmit data to (and receive data from) the second communications module via the Wi-Fi communication link and/or the LTE communication link.

In another example, the first communications module can include a first LTE interface and a second LTE interface. In this example, the first communications module can: establish a first LTE communication link with the second communications module utilizing the first LTE interface; and establish a second LTE communication link with a third communications module with the second LTE interface.

In one implementation, the first communications module can establish a communication link with the second communications module by establishing a communication session based on a particular communication protocol. Additionally or alternatively, the first communications module can establish a communication link with the second communications module based on a network interface configuration (e.g., operating frequency).

4.4.1 Conditions

Generally, a transmitter module can establish a communication link exhibiting a set of conditions (e.g., characteristics, parameters), such as latency, operating frequency, operating power, signal strength, error rate, power consumption, power efficiency, bandwidth, wavelength, communication link status, radio frequency modulation, monetary cost, timing of most recent link transition, etc.

In one implementation, the transmitter module can establish a communication link exhibiting a condition (e.g., operating frequency) based on a configuration of a network interface through which the communication link is established.

For example, the transmitter module can establish: a first communication link via a W-Fi network interface; and a second communication link via an ISM network interface. The transmitter module can establish the first communication link exhibiting a first operating frequency (e.g., 5 Ghz) based on a first configuration of the Wi-Fi network interface. Additionally, the transmitter module can establish the second communication link exhibiting a second operating frequency (e.g., 2.45 GHz) based on a second configuration of the ISM network interface. In this example, the transmitter module can establish the first communication link and the second communication link exhibiting the first operating frequency different from the second operating frequency. The first communication link and the second communication link can exhibit additional conditions based on the first configuration and the second configuration, respectively.

In another implementation, the transmitter module can establish a communication link exhibiting a condition (e.g., latency) based on a state of the communication network.

For example, the transmitter module can establish a third communication link via an LTE interface. During a first time period, the transmitter module can detect a first latency (e.g., $5o$ milliseconds)—such as based on a difference between a receipt time of a message and a timing reference included in the message—exhibited by the third communication link based on a first state of the communication network. However, during a second time period succeeding the first time period, the transmitter module can detect a second latency (e.g., 500 milliseconds) exhibited by the third communication link based on a second state of the communication network, such as due to increased traffic and/or congestion on the communication network. The transmitter module can detect additional conditions exhibited by the third communication link—during the first time period and/or the second time period—based on a state(s) of the communication network.

4.4.2 Metrics

Generally, a transmitter module can generate a set of metrics associated with a communication link. More specifically, the transmitter module can generate a set of metrics corresponding to a set of conditions exhibited by the communication link.

In one implementation, the transmitter module can: monitor a communication link during a time interval in Block S120; and generate a set of metrics exhibited by the communication link during the time interval in Block S128. In one example, the transmitter module can monitor the communication link based on a polling message (or a set of polling messages) utilizing the communication link.

Additionally or alternatively, the transmitter module can generate the set of metrics—associated with a communication link—based on other information, such as information associated with a configuration of a network interface through which the communication link is established.

In another implementation, the transmitter module can generate the set of metrics associated with the communication link, the set of metrics including: latency (e.g., recent transmission latency, average transmission latency), operating frequency, operating power, signal strength (e.g., received signal strength indicator (RSSI), recent signal strength, average signal strength), error rate (e.g., recent error rate, average error rate), power consumption (e.g., current power consumption per message, average power consumption per message), power efficiency (e.g., current power efficiency per message, average power efficiency per message), bandwidth, wavelength, communication link status, radio frequency modulation, monetary cost (e.g., current monetary cost per message, average monetary cost per message, monetary cost per byte of data), timing of most recent link transition, etc.

The transmitter module can implement similar methods and techniques to monitor and generate a set of metrics for each communication link—in the set of communication links—during a time interval. Alternatively, the transmitter module can selectively monitor and generate a set of metrics for a subset of communication links in the set of communication links.

4.4.3 Communication Link Selection

Generally, the transmitter module can: select a communication link with which to transmit a set of data in a data stream; and transmit the set of data via the communication link. More specifically, the transmitter module can select a communication link—with which to transmit the set of data—exhibiting a set of conditions corresponding to a set of target conditions defined by a policy associated with a data class corresponding to a data stream containing the set of data.

In one implementation, in response to classifying a first data stream—including a first set of data—into a first data class, the transmitter module can: access a first policy defining a first set of target conditions in Block S112; select a first communication link, in a set of communication links, exhibiting a set of conditions corresponding to the first set of target conditions in Block S130; and transmit the first set of data via the first communication link in Block S144. In this implementation, the transmitter module can: select the first communication link as an active communication link for the first data stream; and assign and/or transition the first communication link to an active state for transmitting data in the first data stream.

For example, the transmitter module can: access a first policy defining a first set of target conditions including a latency falling below a first latency threshold and an error rate falling below a first error rate threshold; access a first set of metrics associated with the first communication link and representing a set of conditions exhibited by the first communication link; and select the first communication link based on the first set of metrics. In this example, the transmitter module can access the first set of metrics including a first latency falling below the first latency threshold and a first error rate falling below the first error rate threshold.

In one variation, in response to classifying the first data stream—including a first set of data—into the first data class, the transmitter module can: access the first policy defining a first set of target conditions in Block S116; and select a subset of communication links in a set of communication links in Block S130, each communication link in the subset of communication links exhibiting a set of conditions corresponding to the first set of target conditions. In this variation, the transmitter module can: select a first communication link in the subset of communication links as an active communication link for the first data stream in Block S132; and select a second communication link in the subset of communication links as a backup communication link for the first data stream in Block S134. The transmitter module can select additional communication links—in the subset of communication links—as backup communication links for the first data stream. The transmitter module can then transmit the first set of data via the first communication link in Block S144.

In another implementation, for each communication link selected as a backup communication link for a data stream, the transmitter module can assign and/or transition the communication link to a "warm backup" state, each communication link in a warm backup state available to transition to an active state, as described in further detail below.

Additionally or alternatively, the transmitter module can exclude a third communication link—in the set of communication links—from the subset of communication links in Block S140. For each communication link, in the set of communication links, excluded from the subset of communication links, the transmitter module can assign and/or transition the communication link in a "cold backup" state, each communication link in the cold backup state characterized as deactivated or exhibiting a low power mode.

In one example, the transmitter module can exclude the third communication link based on a difference between a set of conditions—exhibited by the third communication link—and the first set of target conditions exceeding a threshold (e.g., 0%, 5%, 15%). In another example, the transmitter module can exclude the third communication link based on a difference between a first condition—in a set of conditions exhibited by the third communication link—and a first target condition in the first set of target conditions exceeding the threshold.

Accordingly, the transmitter module can select multiple communication links—through which data in a data stream may be transmitted—exhibiting sets of conditions that correspond to a set of target conditions (e.g., quality of service requirements) defined by a policy associated with the data stream. Therefore, the transmitter module can leverage these communication links to meet and/or exceed quality of service requirements while transmitting data in the data stream.

4.4.4 Communication Link Prioritization & Scoring

Generally, a transmitter module can select a first communication link as an active communication link for a data stream based on a set of metrics—associated with the first communication link—and a priority scheme. More specifically, the transmitter module can select the first communication link as the active communication link for the data stream based on the set of metrics and a priority scheme defined in a policy associated with the data stream.

In one implementation, the transmitter module can select a first communication link as an active communication link for a first data stream based on: a first set of metrics—associated with the first communication link—corresponding to a first set of target conditions associated with the first data stream; and a priority scheme defining the first communication link as a highest priority link.

In another implementation, the transmitter module can: access a second policy, associated with a second data stream, defining a second priority scheme defining a set of weights; access a second set of metrics associated with a second communication link; and calculate a first score—associated with a second communication link in a set of communication links—based on the second set of metrics and the set of weights, each weight in the set of weights corresponding to a metric in the set of metrics. The transmitter module can select the second communication link as an active communication link for the second data stream based on the first score exhibiting a highest score in a set of scores, each score in the set of scores associated with a communication link in the set of communication links.

Accordingly, the transmitter module can select a communication link based on a set of metrics exhibited by the communication link and a priority scheme (e.g., set of weights) associated with a particular data stream to be transmitted via the communication link. Therefore, the transmitter module can select a communication link—in a set (or subset) of communication links—that is a best fit for the particular data stream according to performance, power efficiency, and/or monetary cost, etc.

In one example, in response to classifying a first data stream into a first data class (e.g., safety critical data class), the transmitter module can access a first policy corresponding to the first data class and defining: a first set of target conditions associated with the first data class; and a first priority scheme defining a first set of weights including a first weight (e.g., 10) associated with error rate, a second weight (e.g., 9) associated with latency, a third weight (e.g., 8) associated with signal strength, a fourth weight (e.g., 2) associated with power consumption, and a fifth weight (e.g., 1) associated with monetary cost. In this example, the transmitter module can: access a first set of metrics associated with a first communication link; calculate a first score based on the first set of metrics and the first set of weights; and select the first communication link as an active communication link for the first data stream based on the first score exhibiting a highest score in a first set of scores. The transmitter module can then transmit data in the first data stream via the first communication link.

Accordingly, by calculating a score based on the first priority scheme—associated with a safety critical data class—that prioritizes error rate (e.g., relatively low error rate), latency (e.g., relatively low latency), and signal strength (e.g., relatively high signal strength), the transmitter module can select a communication link that minimizes error in data transmission, latency caused by congestion in the network, and drops in data transmission, thereby enabling the system to utilize a most efficient communication link while ensuring compliance with functional safety requirements.

In another example, in response to classifying a second data stream into a second data class (e.g., informational data class), the transmitter module can access a second policy corresponding to the second data class and defining: a second set of target conditions associated with the second data class; and a second priority scheme defining a second set of weights including a sixth weight (e.g., 10) associated with monetary cost, a seventh weight (e.g., 9) associated with power efficiency, an eighth weight (e.g., 2) associated with error rate, and a ninth weight (e.g., 1) associated with latency. In this example, the transmitter module can: access a second set of metrics associated with a second communication link; calculate a second score based on the second set of metrics and the second set of weights; and select the second communication link as an active communication link for the second data stream based on the second score exhibiting a highest score in a second set of scores. The transmitter module can then transmit data in the second data stream via the second communication link.

Accordingly, by calculating a score based on the second priority scheme—associated with an informational data class—that prioritizes power efficiency (e.g., relatively high power efficiency) and monetary cost (e.g., relatively lower monetary cost), the transmitter module can select a communication link that conserves power and/or monetary resources for lower priority informational data, thereby enabling the system to reserve these power and/or monetary resources for higher priority data transmission, such as transmission of safety critical data.

4.4.5 Communication Link Selection for Multiple Data Streams

Block S130 of the method S100 recites selecting a subset of communication links, in a set of communication links between the first communications module and a second communications module, corresponding to the first set of target conditions and the second set of target conditions.

Blocks S144 and S146 of the method S100 recite transmitting the first set of data and the second set of data via a first communication link in the subset of communication links, the first communication link exhibiting a first latency falling below the first threshold.

In one implementation, the transmitter module can implement similar methods and techniques to: select a communication link that exhibits a set of conditions corresponding to multiple sets of target conditions associated with multiple data streams; and transmit data in these data streams via the communication link.

For example, in response to classifying a first data stream—including a first set of data—into a first data class, the transmitter module can: access a first policy defining a first set of target conditions (e.g., a latency falling below a first latency threshold, an error rate falling below a first error rate threshold, a first power consumption threshold, a monetary cost falling below a first monetary cost threshold) in Block S116. In Block S118, the transmitter module can access a second policy defining a second set of target conditions (e.g., a latency falling below a second latency threshold, an error rate falling below a second error rate threshold, a second power consumption threshold, a monetary cost falling below a second monetary cost threshold) in response to classifying a second data stream—including a second set of data—into a second data class. The transmitter module can select a subset of communication links in a set of communication links in Block S130, each communication link in the subset of communication links exhibiting a set of conditions corresponding to the first set of target conditions and the second set of target conditions. More specifically, the transmitter module can select the subset of communication links, each communication link in the subset of communication links exhibiting: a latency falling below the first latency threshold and the second latency threshold; an error rate falling below the first error rate threshold and the second error rate threshold; a power consumption falling below the first power consumption threshold and the second power consumption threshold; and a monetary cost falling below the first monetary cost threshold and the second monetary cost threshold.

In this example, the transmitter module can: select a first communication link in the subset of communication links as an active communication link for the first data stream and the second data stream in Block S132; and select a second communication link in the subset of communication links as a backup communication link for the first data stream and/or the second data stream in Block S134. The transmitter module can select the first communication link as the active communication link based on a first set of metrics associated with the first communication link, as described above. The transmitter module can select additional communication links—in the subset of communication links—as backup communication links for the first data stream and/or the second data stream. The transmitter module can then transmit the first set of data and the second set of data via the first communication link in Blocks S144 and S146.

Alternatively, the transmitter module can: select the first communication link as an active communication link for the first data stream and as a backup communication link for the second data stream; select a second communication link in the subset of communication links as an active communication link for the second data stream and as a backup communication link for the first data stream; transmit data in the first data stream via the first communication link; and transmit data in the second data stream via the second communication link.

Additionally or alternatively, the transmitter module can exclude a third communication link—in the set of communication links—from the subset of communication links in Block S140. For example, the transmitter module can exclude the third communication link based on a difference between a set of conditions—exhibited by the third communication link—and the first target set of target conditions and/or the second set of target conditions exceeding a threshold (e.g., 0%, 5%, 15%).

5. Data Reception

Blocks of the method S100 recite: in response to receiving the first set of data, validating the first safety state information as a first validated safety state in Block S160; and outputting the first validated safety state to a second node in Block S182.

Generally, a second communications module (e.g., receiver module associated with a second node) can: receive a set of data—in a data stream—from a first communication module (e.g., transmitter module associated with a first node); and output the set of data to the second node. More specifically, the receiver module can: receive a first set of data—in a first data stream—from the transmitter module; process the first set of data as a first set of processed data; and output the first set of processed data to the second node.

In one implementation, the receiver module can: receive a first set of data—including safety state information—from the transmitter module in Block S152; validate the safety state information as a validated safety state in Block S160; and output the validated safety state to the second node in Block S182, as described in further detail below.

6. Monitoring

Blocks of the method S100 recite: in response to selecting the first communication link as the first active communication link for the first data stream and the second data stream, periodically monitoring the first communication link at a first predefined time interval associated with the first data class in Block S122; in response to selecting the second communication link as the first backup communication link, periodically monitoring the second communication link at a second predefined time interval in Block S124; and, in response to excluding the third communication link from the subset of communication links, periodically monitoring the third communication link at a third predefined time interval in Block S126.

Block S128 of the method S100 recites generating a group of sets of metrics associated with the subset of communication links.

Figure 4:
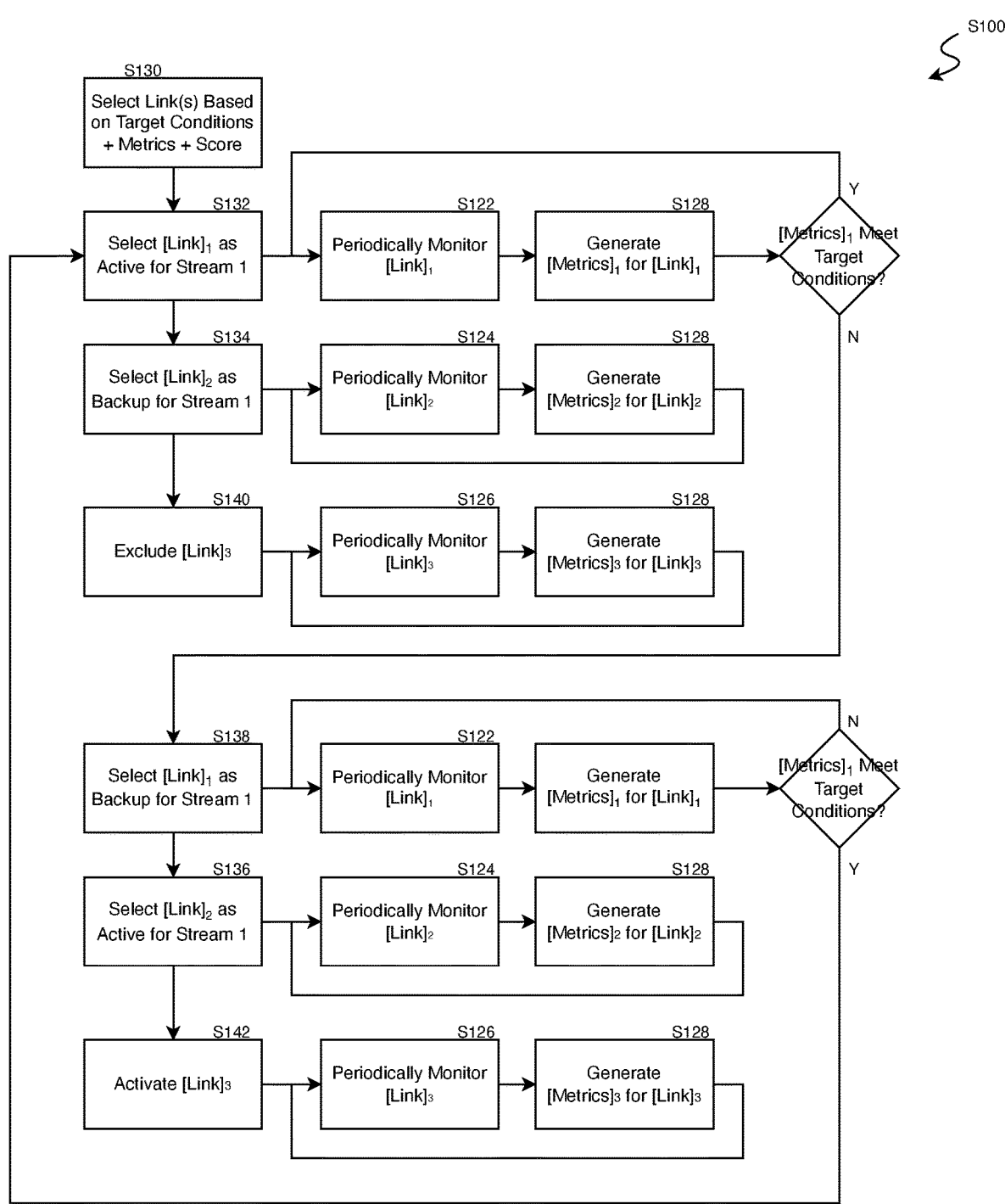
FIG. 4 is a flowchart representation of one variation of the method.

Generally, as shown in FIG. 4, the transmitter module can implement similar methods and techniques: to select a subset of communication links in a set of communication links between the transmitter module and the receiver module; to periodically monitor the subset of communication links; and to periodically generate a group of sets of metrics for the subset of communication links. For example, the transmitter module can generate the group of sets of metrics including: a first set of metrics associated with a first communication link in the subset of communication links; and a second set of metrics associated with a second communication link in the subset of communication links.

In one implementation, the transmitter module can periodically monitor a communication link—in the subset of communication links—based on selection of the communication link as an active communication link (or a backup communication link) for a data stream.

For example, the transmitter module can: periodically monitor a first communication link—selected as an active communication link for a data stream and exhibiting an active state—at a first predefined time interval (e.g., 20 milliseconds) in Block S122; and periodically monitor a second communication link—selected as a backup communication link (e.g., in a "warm backup" state) for the data stream and exhibiting a warm backup state—at a second predefined time interval (e.g., 100 milliseconds) in Block S124. In this example, the transmitter module can periodically monitor a third communication link—excluded from the subset of communication links and exhibiting a cold backup state—at a third predefined time interval (e.g., 1 second, 5 minutes) in Block S126. Alternatively, the transmitter module can omit periodic monitoring of the third communication link exhibiting the cold backup state. The transmitter module can access the first predefined time interval, the second predefined time interval, and/or the third predefined time interval in a policy associated with the data stream.

Additionally or alternatively, the transmitter module can periodically monitor the communication link—selected as the active communication link (or the backup communication link) for a data stream—based on a data class into which the data stream is classified. In one example, the transmitter module can periodically monitor a first communication link—selected as an active communication link for a first data stream classified into a safety critical data class—at a first predefined time interval (e.g., 20 milliseconds). In another example, the transmitter module can periodically monitor a second communication link—selected as an active communication link for a second data stream classified into a control critical data class—at a second predefined time interval (e.g., 100 milliseconds).

Accordingly, by periodically monitoring different communication links at different time intervals based on link state (e.g., active, warm backup, cold backup) and/or data class, the transmitter module can thereby reduce a power consumption resulting from monitoring the communication links while maintaining quality of service requirements for transmitting data via these communication links.

In one variation, the transmitter module can calculate a time interval (or frequency) at which to monitor a communication link based on an algorithm (e.g., a machine learning algorithm), the algorithm based on: a link state (e.g., active, warm backup) of the communication link; a power consumption for status polling; and a timing of a most recent link transition. In this variation, the transmitter module can calculate the time interval—based on the algorithm—exhibiting a minimum computational cost responsive to status polling while maintaining quality of service requirements (e.g., performance) of the communication link.

7. Communication Link Switching

Figure 2:
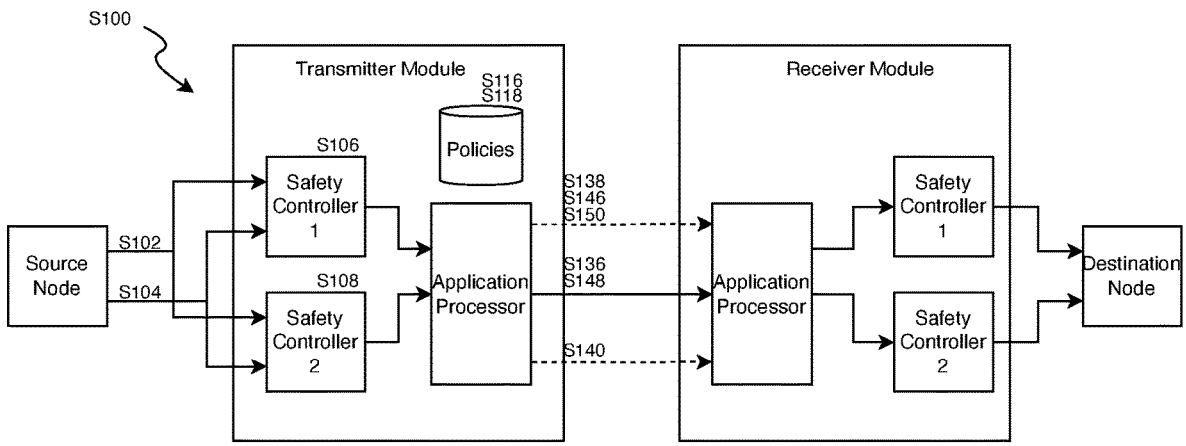
FIG. 2 is a flowchart representation of one variation of the method.

Generally, as shown in FIG. 2, a transmitter module can: periodically monitor a communication link, selected as an active communication link for a data stream, for a first set of conditions; detect a degradation in link quality of the communication link, such as due to increased congestion on the communication network and/or increased physical distance between the transmitter module and a receiver module; and select a new communication link—exhibiting a second set of conditions corresponding to the set of target conditions—as the active communication link for the data stream.

In one implementation, during a first time period, the transmitter module can: select a subset of communication links in a set of communication links in Block S130, each communication link in the subset of communication links exhibiting a set of conditions corresponding to a set of target conditions; select a first communication link in the subset of communication links as an active communication link for a first data stream in Block S132, such as based on a priority scheme; and transmit data in the first data stream via the first communication link in Block S144.

During a second time period succeeding the first time period, the transmitter module can: periodically monitor the subset of communication links in Blocks S122, S124, and S126; periodically generate sets of metrics for the subset of communication links in Block S128; in response to detecting a difference between a first set of metrics—associated with the first communication link—and the set of target conditions exceeding a threshold, select a second communication link, in the subset of communication links and exhibiting a warm backup state, as the active communication link for the data stream in Block S136; and transmit data in the data stream via the second communication link in Block S148. More specifically, the transmitter module can: select the second communication link as the active communication link for the data stream based on the priority scheme and a second set of metrics—associated with the second communication link—corresponding to the set of target conditions; and transition the second communication link from a warm backup state to an active state.

Accordingly, by detecting a degradation in link quality exhibited by the first communication link based on the first set of metrics, which may not meet quality of service requirements of the data stream, the transmitter module can transition the data stream to the second communication link based on the second set of metrics, thereby enabling the system to maintain the quality of service requirements of the data stream.

In another implementation, during a third time period succeeding the second time period, in response to selecting the second communication link as the active communication link for the data stream, the transmitter module can: select the first communication link as a backup communication link for the data stream in Block S138; and transition the first communication link from an active state to a warm backup state. The transmitter module can: periodically monitor the first communication link at a predefined interval associated with a communication link in a warm backup state in Block S122; in response to detecting the first set of conditions—exhibited by the first communication link—corresponding to the set of target metrics, select the first communication link as the active communication link for the data stream based on the priority scheme in Block S132; and transmit data in the data stream via the first communication link in Block S144. Additionally, the transmitter module can select the second communication link as a backup communication link for the data stream in Block S134.

7.1 Cold Backup Activation

In one variation, during the second time period succeeding the first time period, in response to selecting the second communication link as the active communication link for the data stream, the transmitter module can: activate the third communication link, excluded from the subset of communication links, as a backup communication link for the data stream in Block S142; and transition the third communication link from a cold backup state to a warm backup state. For example, the transmitter module can transition the third communication link from a cold backup state to a warm backup state by establishing a communication session based on a particular communication protocol and/or a particular network interface configuration. The transmitter module can periodically monitor the third communication link at a predefined time interval associated with a communication link exhibiting a warm backup state in Block S126. In this variation, the transmitter module can activate the third communication link exhibiting a set of conditions (and/or a set of metrics) corresponding to the set of target conditions.

7.2 Selective Link Transition

Blocks of the method S100 recite, in response to the first communication link exhibiting a second latency exceeding the first threshold and falling below the second threshold: transmitting a third set of data in the first data stream via a second communication link in the subset of communication links in Block S148, the second communication link exhibiting a third latency falling below the first threshold; and transmitting a fourth set of data in the second data stream via the first communication link in Block S146.

In one implementation, during a first time period, the transmitter module can: access a first policy associated with a first data class and defining a first set of target conditions including a latency falling below a first threshold (e.g., 25 milliseconds) in Block S116; access a second policy associated with a second data stream and defining a second set of target conditions including a latency falling below a second threshold (e.g., 100 milliseconds) in Block S118; and select a subset of communication links in a set of communication links in Block S130, each communication link in the subset of communication links corresponding to the first set of target conditions and the second set of target conditions. For example, the transmitter module can select a first communication link exhibiting a first latency (e.g., 20 milliseconds) falling below the first threshold and the second threshold. The transmitter module can: transmit a first set of data (e.g., a first message representing a first safety state of a first node) in the first data stream via the first communication link in Block S144; and transmit a second set of data in the second data stream via the first communication link in Block S146.

In another implementation, during a second time period succeeding the first time period, the transmitter module can periodically monitor the subset of communication links in Blocks S122, S124, and S126. More specifically, the transmitter module can: monitor the first communication link at a first predefined time interval associated with the first data class and/or associated with an active state in Block S122; and monitor the second communication link at a second predefined time interval associated with the second data class and/or associated with a warm backup state in Block S124.

During the second time period, the transmitter module can generate a group of sets of metrics associated with the subset of communication links in Block S128. For example, the transmitter module can: generate a first set of metrics associated with the first communication link, the first set of metrics including a second latency (e.g., 60 milliseconds); and generate a second set of metrics associated with the second communication link, the second set of metrics including a third latency (e.g., 22 milliseconds).

In response to the first communication link exhibiting the second latency exceeding the first threshold, the transmitter module can: select the second communication link as an active communication link for the first data stream based on the second set of metrics including the third latency falling below the first threshold in Block S136; transition the second communication link from a warm backup state to an active state for the first data stream; and transmit a third set of data (e.g., a second message representing a second safety state of the first node) in the first data stream via the second communication link in Block S148.

Additionally, the transmitter module can transmit the third set of data (or a subset of data in the third set of data) in the first data stream via the first communication link in Block S150, thereby transmitting duplicate data via the first communication link and the second communication link. For example, the transmitter module can transmit the second message via the first communication link. In response to receiving the duplicate data (e.g., the third set of data, the subset of data in the third set of data), the receiver module can transmit a signal—representing completion of a link transition process—to the transmitter module.

Accordingly, by transmitting duplicate data via the first communication link and the second communication link, the transmitter module can ensure uninterrupted transmission of the first data stream due to a link transition, thereby ensuring quality of service and preventing interruption of the system.

In another implementation, in response to the first communication link exhibiting the second latency exceeding the first threshold and falling below the second threshold, the transmitter module can transmit a fourth data set in the second data stream via the first communication module.

In one implementation, in response to selecting the second communication link as an active communication link for the first data stream, the transmitter module can implement similar methods and techniques to: periodically monitor the second communication link at the first predefined interval associated with the active state; activate a third communication link—exhibiting a cold backup state—as a second backup communication link; transition the third communication link from a cold backup state to a warm backup state; and periodically monitor the third communication link at the second predefined interval associated with the warm backup state.

In another implementation, during a third time period succeeding the second time period, in response to the first communication link exhibiting a fourth latency (e.g., 23 milliseconds) falling below the first threshold and the second threshold, the transmitter module can implement similar methods and techniques to: select the first communication link as an active communication link for the first data stream; transition the first communication link from a warm backup state to an active state; transition the second communication link from an active state to a warm backup state; and transmit data in the first data stream via the first communication link.

Accordingly, the transmitter module can selectively transition a data stream(s) between multiple communication links based on dynamic conditions of these communication links. Therefore, the system can utilize a most efficient communication link for the data stream(s) to conserve resources (e.g., power, monetary) while ensuring compliance with quality of service requirements and/or functional safety standards.

8. Message Generation

Figure 5:
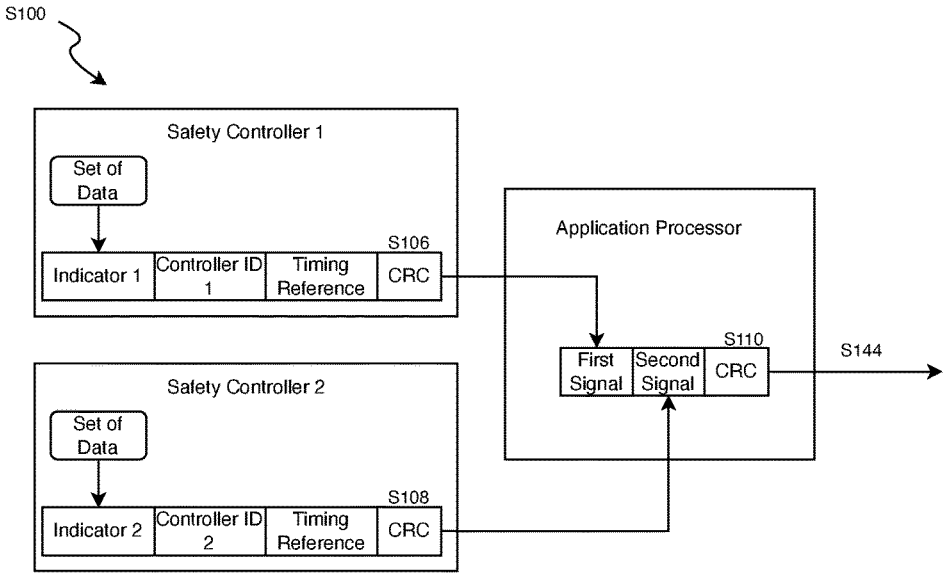
FIG. 5 is a flowchart representation of one variation of the method.

Generally, as shown in FIG. 5, a transmitter module can generate a message (e.g., safety message) including a set of data in a data stream, the set of data including safety information associated with a source node communicatively coupled to the transmitter module. The transmitter module can transmit the message to a receiver module, which can validate the message and output the set of data to a destination node communicatively coupled to the receiver module.

In one implementation, the transmitter module can generate a message—including a set of data in a data stream—based on a set of requirements defined in a policy for the data stream. For example, the transmitter module can: access a set of data in a data stream, the set of data including safety information associated with a first node (e.g., emergency stop device) communicatively coupled to the transmitter module; classify the data stream into a first data class associated with safety critical data based on the safety information; and access a policy associated with a policy associated with the first data class.

In this implementation, the transmitter module can access the policy—defining the set of requirements including a source authentication requirement, an encryption requirement, a redundant frame requirement, an error code correction requirement, a variable encoding requirement, a periodicity requirement, and a latency requirement—for the data stream and generate a message based on this set of requirements. In this example, the transmitter module can generate a message including: source authentication information (e.g., signature); encryption session information (e.g., encryption key, encryption seed); and a set of redundant signals representing a set of data of the data stream. The set of redundant signals can include: a first signal including the set of data encoded with a first encoding scheme, a timing reference (e.g., timestamp), and a first CRC value; and a second signal including the set of data encoded with a second encoding scheme, the timing reference, and a second CRC value.

Accordingly, the transmitter module can generate messages according to a policy associated with the data stream, thereby maintaining safety, security, and/or integrity requirements of the data stream and the entire system while communicating this data stream across an untrusted communication network.

8.1 Redundant Signals

Generally, the first controller and the second controller in the transmitter module can each generate a redundant signal including encoded data representing a set of data in a data stream, a controller identifier, and/or error correction code.

Accordingly, the first controller and the second controller can implement different encoding schemes—exhibiting a minimum hamming distance(s) (e.g., 4, 8, 16) from each other—to generate the redundant signals, thereby enabling detection of interference, bit flips, and/or software overwrites of data within these signals.

8.1.1 First Redundant Signal

Block S106 of the method S100 recites, at a first controller of a first communications module, generating a first signal representing a first safety state of a first node.

Generally, the first controller can generate a first signal (e.g., first sub-message) representing a first safety state of the source node (e.g., emergency stop device, line break sensor).

In one implementation, in response to receiving a first input signal—representing a set of data in a data stream—at an input (e.g., first redundant input) of the first controller communicatively coupled to the source node, the first controller can detect a first ternary state (e.g., asserted, unasserted, fault, undefined) of the source node based on the first input signal. In one example, the first controller can detect an asserted state of the source node responsive to the input signal exhibiting a first value (e.g., voltage, current) within a first range (e.g., exceeding 4 volts). In another example, the first controller can detect an unasserted state of the source node responsive to the input signal exhibiting a second value within a second range (e.g., falling below 1 volt). In yet another example, the first controller can detect a fault (or undefined) state of the source node responsive to the input signal exhibiting a third value within a third range (e.g., 1-4 volts).

In another implementation, in response to detecting the first ternary state of the source node based on the input signal, the first controller can select a first indicator—in a first set of indicators encoded according to a first encoding scheme associated with the first controller—based on the first ternary state.

In one example, in response to detecting an unasserted state of the source node, the first controller can select a first unasserted indicator in the first set of indicators. In another example, in response to detecting an asserted state of the source node, the first controller can select a first asserted indicator in the first set of indicators. In yet another example, in response to detecting a fault state of the source node, the first controller can select a first fault indicator in the first set of indicators. In these examples, each indicator in the first set of indicators can: exhibit a minimum hamming distance (e.g., 2, 4) from another indicator in the first set of indicators; and exhibit a predefined length (e.g., one byte).

In one implementation, in Block S106, the first controller can generate the first signal representing a safety state of the source node, the first signal including: the first indicator; a first identifier associated with the first controller; a first timing reference (e.g., timestamp, sequence number); a first error correction code value (e.g., 16-bit cyclic redundancy check (CRC) value, 32-bit CRC value); and/or other information. In this implementation, the first controller can generate the first signal including the first identifier exhibiting a predefined length (e.g., two bytes).

8.1.2 Second Redundant Signal

Block S108 of the method S100 recites, at a second controller of the first communications module, generating a second signal representing the first safety state.

Generally, the second controller can implement similar methods and techniques to generate a second signal representing the safety state of the source node, the second signal including: a second indicator; a second identifier associated with the second controller; a second timing reference; a second error correction code value; and/or other information.

In one implementation, in response to receiving a second input signal—representing the set of data in the data stream—at an input (e.g., second redundant input) of the second controller communicatively coupled to the source node, the second controller can detect a second ternary state (e.g., asserted, unasserted, fault, undefined) of the source node, such as based on the second input signal exhibiting a value in the first range, the second range, or the third range described above.

In one variation, in response to receiving the second input signal, the second controller can: adjust (or process) the second input signal, such as via a clamp, as an adjusted input signal; and detect the second ternary state of the source node based on the adjusted input signal. In one example, the second controller can detect an asserted state of the source node responsive to the adjust input signal exhibiting a fourth value (e.g., voltage, current) within a fourth range (e.g., exceeding 10 volts). In another example, the second controller can detect an unasserted state of the source node responsive to the adjust input signal exhibiting a fifth value within a fifth range (e.g., falling below 3 volts). In yet another example, the first controller can detect a fault (or undefined) state of the source node responsive to the adjusted input signal exhibiting a sixth value within a sixth range (e.g., 3-10 volts).

In another implementation, in response to detecting the second ternary state of the source node based on the second input signal (or the adjusted input signal), the second controller can select a second indicator—in a second set of indicators encoded according to a second encoding scheme associated with the second controller—based on the second ternary state.

In one example, in response to detecting an unasserted state of the source node, the second controller can select a second unasserted indicator in the second set of indicators. In another example, in response to detecting an asserted state of the source node, the second controller can select a second asserted indicator in the second set of indicators. In yet another example, in response to detecting a fault state of the source node, the second controller can select a second fault indicator in the second set of indicators. In these examples, each indicator in the second set of indicators can: exhibit a minimum hamming distance (e.g., 2, 4) from another indicator in the second set of indicators; exhibit a minimum hamming distance (e.g., 2, 4) from another indicator in the first set of indicators; and exhibit a predefined length (e.g., one byte).

In one implementation, in Block S108, the second controller can generate the second signal representing the safety state of the source node, the second signal including: the second indicator; the second identifier associated with the second controller; a second timing reference; the second error correction code value; and/or other information. In this implementation, the second controller can generate the second signal including the second identifier: exhibiting a predefined length (e.g., two bytes); and exhibiting a minimum hamming distance (e.g., 4, 8) from the first identifier.

8.2 Message Transmission

Blocks of the method S100 recite, at a first processor of the first communications module: in response to accessing the first signal and the second signal, generating a first message including the first signal and the second signal in Block S110; classifying the first message into a first data class, in a set of data classes, based on the first signal and the second signal in Block S112; accessing a first policy, in a set of policies, associated with the first data class, the first policy defining a first set of target conditions including an error rate falling below a first threshold in Block S116; selecting a subset of communication links, in a set of communication links between the first communications module and a second communications module, corresponding to the first set of target conditions in Block S130; and transmitting the first message via a first communication link in the subset of communication links, the first communication link exhibiting a first error rate falling below the first threshold in Block S144.

Generally, the transmitter module can generate a message including the first signal and the second signal. The transmitter module can then implement similar methods and techniques to: classify the message into a data class based on the first signal and the second signal; access a policy—associated with the data class—defining a set of target conditions; select a subset of communication links corresponding to the set of target conditions; and transmit the message via a first communication link in the subset of communication links.

In one implementation, the first processor of the transmitter module can: access (or receive) the first signal from the first controller; access (or receive) the second signal from the second controller; and generate a first message including the first signal and the second signal in Block S110. More specifically, the first processor can generate the first message by concatenating the first signal and the second signal. Additionally, the first processor can generate the first message further including a third error correction code value (e.g., cumulative CRC value) for the message and/or other information.

In another implementation, the first processor can: classify the first message into a first data class (e.g., safety critical data class) based on the first indicator in the first signal and the second indicator in the second signal in Block S112; access a first policy associated with the first data class and defining a first set of target conditions, such as an error rate falling below a first threshold (e.g., 0.001%) in Block S116; selecting a subset of communication links, in a set of communication links, corresponding to the first set of target conditions in Block S130, the subset of communication links including a first communication link exhibiting a first error rate (e.g., 0.0001%) falling below the first threshold; and transmitting the first message via the first communication link in Block S144.

In one implementation, the transmitter module can implement similar methods and techniques to: generate a third signal including a third indicator encoded according to the first encoding scheme and representing a second safety state of the source node; generate a fourth signal including a fourth indicator encoded according to the second encoding scheme and representing the second safety state of the source node; generate a second message including a third signal and the fourth signal; and transmitting the second message via a communication link—in the subset of communication links—corresponding to the first set of target conditions. More specifically, in response to the first communication link exhibiting a second error rate exceeding the first threshold, the transmitter module can transmit the second message via a second communication link exhibiting a third error rate falling below the first threshold.

9. Safety State Detection & Control

Blocks of the method S100 recite: in response to receiving the first set of data, validating the first safety state information as a first validated safety state in Block S160; and outputting the first validated safety state to a second node in Block S182.

Figure 6:
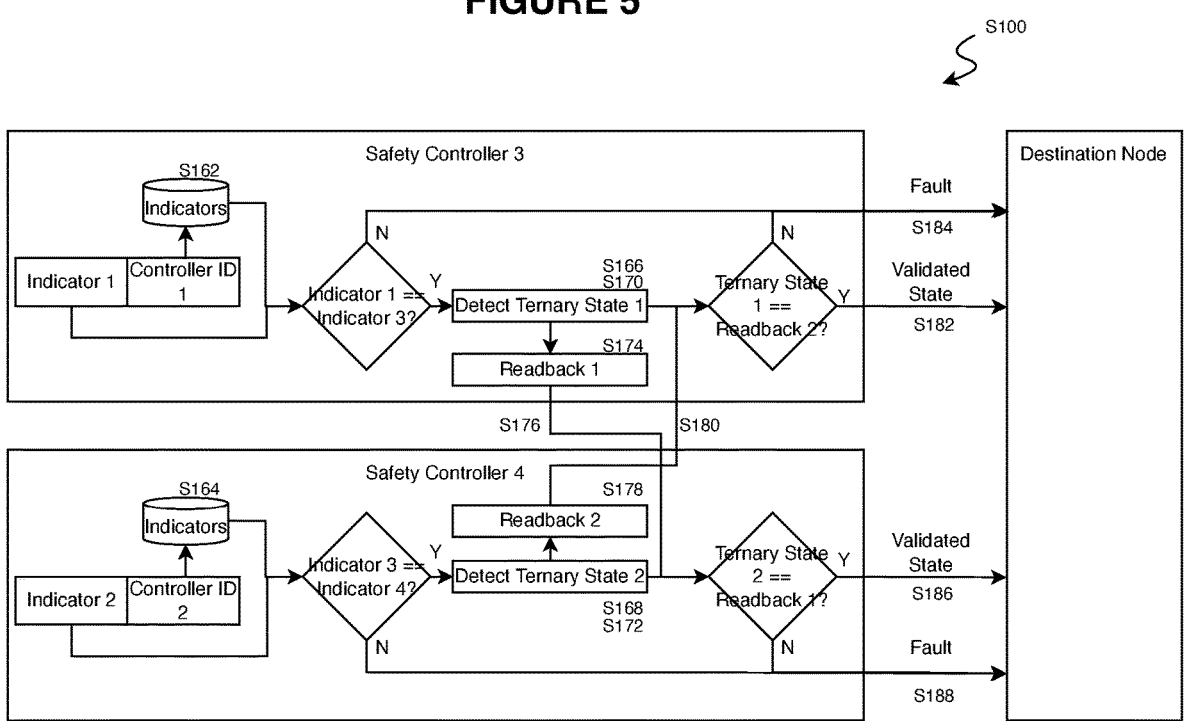
FIG. 6 is a flowchart representation of one variation of the method.

Generally, as shown in FIG. 6, a receiver module can: receive a message from the transmitter module through the communication network (e.g., via the first communication link); detect a state (e.g., safety state) of the source node based on the message; and output a signal representing the state of the source node to the destination node. More specifically, in response to receiving the message—including safety state information—from the transmitter module, the transmitter module can: validate the safety state information as a validated safety state; and output the validated safety state to the destination node.

9.1 Signal Separation

In one implementation, the receive module can receive a first message including a first signal and a second signal, the first signal including a first indicator encoded according to a first encoding scheme and a first identifier associated with a first controller of the transmitter module, and the second signal including a second indicator encoded according to a second encoding scheme and a second identifier associated with a second controller of the transmitter module.

In response to receiving the first message from the transmitter module, a second processor of the receiver module can: separate the first signal and the second signal in Block S154; output the first signal to a third controller of the receiver module in Block S156; and output the second signal to a fourth controller of the receiver module in Block S158.

9.2 First Signal Validation

Block S166 of the method S100 recites, at the third controller, detecting a first ternary state of the first node based on the first signal.

Blocks of the method S100 recite, at the third controller: generating a third signal based on the first ternary state in Block S174; and outputting, to the fourth controller, the third signal as a first readback value in Block S176.

In one implementation, the third controller can receive the first signal from the second processor, the first signal including: the first indicator encoded according to the first encoding scheme; and the first identifier associated with the first controller.

In another implementation, the third controller can detect a first ternary state (e.g., unasserted, asserted, fault, undefined) of the source node based on the first signal in Block S110. More specifically, in response to detecting the first identifier in the first signal, the third controller can access a third set of indicators—encoded according to the first encoding scheme—based on the first identifier in Block S162. The third controller can detect a match between the first indicator and a third indicator in the third set of indicators in Block S166; and identify the first ternary state of the source node based on the third indicator in Block S110.

The third controller can output the first ternary state to the destination node in Block S182.

In one example, in response to detecting an asserted state of the source node based on the first signal, the third controller can output a first signal exhibiting a first voltage—corresponding to the asserted state—to the destination node. In another example, in response to detecting an asserted state of the source node based on the first signal, the third controller can output a first command—in a set of commands—representing the asserted state, each command in the set of commands exhibiting a minimum hamming distance (e.g., 4, 8) from another command in the set of commands. In these examples, the destination node can receive the first signal or the first command; and transition to a safe state (e.g., disengage power, disconnect fuel source) based on the asserted state of the source node represented in the first signal or the first command. Additionally or alternatively, in response to receiving the first signal or the first command, the destination node (e.g., safety controller, zone controller) can transition a set of nodes (e.g., safety modules, communications modules, machines, devices)—controlled and/or managed by the destination node—in a safe state.

In yet another example, in response to detecting a fault state of the source node based on the first signal, the third controller can output a second command—in the set of commands—representing the fault state. In this example, the destination node can receive the second command; and transition to the safe state based on the fault state of the source node represented in the second command.

In yet another example, in response to detecting an unasserted state of the source node based on the first signal, the third controller can output a third command—in the set of commands—representing the unasserted state. In this example, the destination node can receive the third command; and continue operation based on the unasserted state of the source node represented in the third command.

Additionally, the third controller can: generate a third signal based on the first ternary state in Block S174; and output the third signal—as a first readback value—to the fourth controller of the receiver module in Block S176. For example, the third controller can: generate the third signal specifying the first ternary state; and transmit the third signal to the fourth controller.

Therefore, by detecting a match between the first indicator and the third indicator, the third controller can ensure that the first signal is absent interference, bit flips, and/or software overwrites of data.

Alternatively, in response to detecting a difference between the first indicator and each indicator in the third set of indicators, the third controller can output a fault state to the destination node in Block S184.

9.3 Second Signal Validation

Block S172 of the method S100 recites, at the fourth controller, detecting a second ternary state of the first node based on the second signal.

Generally, the fourth controller can implement similar methods and techniques to: receive the second signal from the second processor; detect a second ternary state of the first node based on the second signal; and output the second ternary state to the destination node.

In one implementation, the fourth controller can receive the second signal from the second processor, the second signal including: the second indicator encoded according to the second encoding scheme; and the second identifier associated with the second controller of the transmitter module.

In another implementation, the fourth controller can detect a second ternary state (e.g., unasserted, asserted, fault, undefined) of the source node based on the second signal in Block S172. More specifically, in response to detecting the second identifier in the second signal, the fourth controller can access a fourth set of indicators—encoded according to the second encoding scheme—based on the second identifier in Block S164. The third controller can detect a match between the second indicator and a fourth indicator in the fourth set of indicators in Block S168; and identify the second ternary state of the source node based on the fourth indicator in Block S172. The fourth controller can output the second ternary state to the destination node in Block S186.

Additionally, the fourth controller can: generate a fourth signal based on the second ternary state in Block S178; and output the fourth signal—as a second readback value—to the third controller of the receiver module in Block S180.

Alternatively, in response to detecting a difference between the second indicator and each indicator in the fourth set of indicators, the fourth controller can output a fault state to the destination node in Block S184.

9.4 Readback Validation

In one variation, the third controller in the receiver module can: detect the first ternary state of the source node based on the first signal in Block S110; and, in response to detecting a match between the first ternary state and the first readback value, output the first ternary state to the destination node in Block S182. More specifically, the third controller can output—to the destination node—a signal representing the first ternary state.

Alternatively, in response to detecting a difference between the first ternary state and the first readback value, the third controller can output a fault state to the destination node in Block S184.

In another variation, the fourth controller in the receiver module can implement similar methods and techniques to: detect the second ternary state of the source node based on the second signal in Block S172; and, in response to detecting a match between the second ternary state and the second readback value, output the second ternary state to the destination node in Block S186. Alternatively, in response to detecting a difference between the second ternary state and the second readback value, the fourth controller can output a fault state to the destination node in Block S188.

Accordingly, by verifying a ternary state detected by a controller with a readback value generated by a complementary controller, the system can thereby further detect interference, bit flips, and/or software overwrites of data and verify accuracy of the safety state information.

10. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a first time period:
at a first communications module:
accessing a first set of data in a first data stream, the first set of data comprising first safety state information representing a first safety state of a first node;
in response to detecting the first safety state information, classifying the first data stream into a first data class in a set of data classes;
in response to accessing a second set of data in a second data stream, classifying the second data stream into a second data class in the set of data classes;
accessing a first policy, in a set of policies, associated with the first data class, the first policy defining a first set of target conditions comprising a latency falling below a first threshold;
accessing a second policy, in the set of policies, associated with the second data class, the second policy defining a second set of target conditions comprising a latency falling below a second threshold, the second threshold exceeding the first threshold;
selecting a subset of communication links, in a set of communication links between the first communications module and a second communications module, corresponding to the first set of target conditions and the second set of target conditions; and
transmitting the first set of data and the second set of data via a first communication link in the subset of communication links, the first communication link exhibiting a first latency falling below the first threshold;
at the second communications module:
in response to receiving the first set of data, validating the first safety state as a first validated safety state; and
outputting the first validated safety state to a second node; and
during a second time period succeeding the first time period, at the first communications module, in response to the first communication link exhibiting a second latency exceeding the first threshold and falling below the second threshold:
transmitting a third set of data in the first data stream via a second communication link in the subset of communication links, the second communication link exhibiting a third latency falling below the first threshold; and
transmitting a fourth set of data in the second data stream via the first communication link.

2. The method of claim 1, further comprising, during the second time period, at the first communications module:
generating a group of sets of metrics associated with the subset of communication links, the group of sets of metrics comprising the second latency and the third latency;
selecting the second communication link as an active communication link for the first data stream based on a first set of metrics in the group of sets of metrics; and
transmitting a subset of data in the third set of data via the first communication link.

3. The method of claim 2:
wherein transmitting the third set of data via the second communication link comprises transmitting the third set of data via the second communication link, the third set of data comprising a message representing a second safety state of the first node; and
wherein transmitting the subset of data in the third set of data via the first communication link comprises transmitting the subset of data in the third set of data via the first communication link, the subset of data comprising the message.

4. The method of claim 1:
further comprising, during the second time period, at the first communications module, in response to the first communication link exhibiting a second latency exceeding the first threshold and falling below the second threshold:

selecting the second communication link as a first active communication link for the first data stream; and transitioning the second communication link from a warm backup state to an active state; and further comprising, during a third time period succeeding the second time period, at the first communications module, in response to the first communication link exhibiting a fourth latency falling below the first threshold and the second threshold:

selecting the first communication link as a second active communication link for the first data stream; and transitioning the second communication link from the active state to the warm backup state.

5. The method of claim 1:

wherein selecting the subset of communication links comprises:

selecting the first communication link as a first active communication link for the first data stream and the second data stream;

selecting the second communication link as a first backup communication link in the subset of communication links; and excluding a third communication link, in the set of communication links, from the subset of communication links; and further comprising, during the second time period, at the first communications module, in response to the first communication link exhibiting the second latency:

selecting the second communication link as a second active communication link for the first data stream; and activating the third communication link as a second backup communication link in the subset of communication links.

6. The method of claim 5:

further comprising, during the first time period, at the first communications module:

in response to selecting the first communication link as the first active communication link for the first data stream and the second data stream, periodically monitoring the first communication link at a first predefined time interval associated with the first data class;

in response to selecting the second communication link as the first backup communication link, periodically monitoring the second communication link at a second predefined time interval; and in response to excluding the third communication link from the subset of communication links, periodically monitoring the third communication link at a third predefined time interval; and further comprising, during the second time period, at the first communications module:

in response to selecting the second communication link as the second active communication link for the first data stream, periodically monitoring the second communication link at the first predefined time interval; and in response to activating the third communication link as the second backup communication link, periodically monitoring the third communication link at the second predefined time interval.

7. The method of claim 1:

further comprising, during the first time period, at the first communications module, generating a set of metrics associated with the first communication link, the set of metrics comprising:

a first signal strength;

the first latency;

a first error rate; and a first power efficiency; and wherein selecting the subset of communication links comprises selecting the first communication link as a first active communication link, for the first data stream and the second data stream, based on the set of metrics corresponding to the first set of target conditions and the second set of target conditions.

8. The method of claim 1:

further comprising, during the first time period, at the first communications module, accessing the second set of data comprising a first heartbeat message associated with the first node; and wherein classifying the second set of data into the second data class comprises classifying the second set of data into the second data class based on the first heartbeat message, the set of data classes comprising:

the first data class associated with safety critical data;

the second data class associated with control critical data;

a third data class associated with real-time control critical data; and a fourth data class associated with informational data.

9. The method of claim 1:

wherein accessing the first policy defining the first set of target conditions comprises accessing the first policy defining the first set of target conditions further comprising:

a power consumption falling below a third threshold; and a monetary cost falling below a fourth threshold; and wherein transmitting the first set of data and the second set of data via the first communication link comprises transmitting the first set of data and the second set of data via the first communication link, the first communication link exhibiting:

the first latency falling below the first threshold;

a first power consumption falling below the third threshold; and a first monetary cost falling below the fourth threshold.

10. The method of claim 1:

wherein accessing the first set of data comprises accessing the first set of data comprising the first safety state information comprising:

a first indicator exhibiting a length of one byte and representing the first safety state of the first node; and a second indicator exhibiting a length of one byte and representing the first safety state, the second indicator characterized by a minimum distance of 4 from the first indicator; and wherein classifying the first data stream into the first data class comprises classifying the first data stream into the first data class based on the first indicator and the second indicator.

11. The method of claim 1:

wherein accessing the first set of data comprises accessing the first set of data comprising the first safety state information comprising:

a first signal representing the first safety state of the first node and encoded according to a first encoding scheme; and a second signal representing the first safety state and encoded according to a second encoding scheme;

further comprising, at the first communications module, during the first time period, generating a first message comprising the first signal and the second signal;

wherein classifying the first data stream into the first data class comprises, in response to detecting the first signal and the second signal, classifying the first data stream into the first data class;

wherein transmitting the first set of data via the first communication link comprises transmitting the first message via the first communication link; and wherein validating the first safety state as the first validated safety state comprises, at a third controller of the second communication module:

detecting a first ternary state of the first node based on the first signal; and verifying a match between the first ternary state and a first readback value based on the second signal.

12. The method of claim 11, wherein detecting the first ternary state of the first node based on the first signal comprises detecting the first ternary state of the first node, in a set of ternary states, based on the first signal, the set of ternary states comprising:

an unasserted state of the first node;

an asserted state of the first node; and a fault state of the first node.

13. The method of claim 1:

wherein transmitting the third set of data comprises transmitting the third set of data comprising:

a third signal representing a second safety state of the first node and encoded according to the first encoding scheme; and a fourth signal representing the second safety state and encoded according to the second encoding scheme; and further comprising, at the second communications module, during the second time period:

in response to receiving the third set of data, detecting a second ternary state of the first node based on the third signal; and in response to detecting a difference between the second ternary state and a second readback value based on the fourth signal, outputting a fault state to the second node.

14. The method of claim 1:

wherein transmitting the third set of data comprises transmitting the third set of data comprising a first indicator representing a second safety state of the first node and characterized by a first encoding scheme; and further comprising, at the second communications module, during the second time period:

in response to receiving the third set of data, accessing a set of indicators according to the first encoding scheme; and in response to detecting a difference between the first indicator and each indicator in the set of indicators, outputting a fault state to the second node.

15. The method of claim 1:

wherein validating the first safety state as the first validated safety state comprises validating the first safety state as the first validated safety state representing an asserted state of the first node comprising an emergency stop device; and wherein outputting the first validated safety state to the second node comprises outputting a first signal exhibiting a first voltage, corresponding to the asserted state, to the second node.

16. A method comprising:

at a first controller of a first communications module, generating a first signal representing a first safety state of a first node based on a first encoding scheme associated with the first controller;

at a second controller of the first communications module, generating a second signal representing the first safety state based on a second encoding scheme associated with the second controller;

at a first processor of the first communications module:

in response to accessing the first signal and the second signal, generating a first message comprising the first signal and the second signal;

classifying the first message into a first data class, in a set of data classes, based on the first signal and the second signal;

accessing a first policy, in a set of policies, associated with the first data class, the first policy defining a first set of target conditions comprising an error rate falling below a first threshold;

selecting a subset of communication links, in a set of communication links between the first communications module and a second communications module, corresponding to the first set of target conditions; and transmitting the first message via a first communication link in the subset of communication links, the first communication link exhibiting a first error rate falling below the first threshold;

at a second processor of the second communications module:

in response to receiving the first message, separating the first signal and the second signal;

outputting the first signal to a third controller of the second communications module; and outputting the second signal to a fourth controller of the second communications module;

at the third controller:

detecting a first ternary state of the first node based on the first signal;

generating a third signal based on the first ternary state; and outputting, to the fourth controller, the third signal as a first readback value; and at the fourth controller:

detecting a second ternary state of the first node based on the second signal; and in response to detecting a match between the second ternary state and the first readback value, outputting, to a second node, a fourth signal representing the second ternary state.

17. The method of claim 16:

wherein generating the first signal comprises generating the first signal comprising:

a first indicator, according to the first encoding scheme, representing the first safety state; and a first identifier associated with the first controller;

wherein generating the second signal comprises generating the second signal comprising:

a second indicator, according to the second encoding scheme, representing the first safety state; and a second identifier associated with the second controller;

wherein detecting the first ternary state of the first node based on the first signal comprises:

accessing a first set of indicators, associated with the first encoding scheme, based on the first identifier;

detecting a match between the first indicator and a third indicator in the first set of indicators; and identifying the first ternary state based on the third indicator; and wherein detecting the second ternary state of the first node based on the second signal comprises:

accessing a second set of indicators, associated with the second encoding scheme, based on the second identifier;

detecting a match between the second indicator and a fourth indicator in the second set of indicators; and identifying the second ternary state based on the fourth indicator.

18. The method of claim 17, wherein generating the first signal comprises generating the first signal comprising:

the first indicator exhibiting a first minimum hamming distance from the second indicator; and the first identifier exhibiting a second minimum hamming distance from the second identifier.

19. The method of claim 18:

wherein classifying the first message into the first data class based on the first signal and the second signal comprises classifying the first message into the first data class based on the first indicator and the second indicator; and further comprising, at the first processor:

generating a second message representing a second safety state of the first node; and in response to the first communication link exhibiting a second error rate exceeding the first threshold, transmitting a second message via a second communication link in the subset of communication links, the second communication link exhibiting a third error rate falling below the first threshold.

20. A method comprising:

during a first time period, at a processor:

accessing a first set of data in a first data stream, the first set of data comprising a first encoded value representing a first safety state of an emergency stop device;

classifying the first data stream into a first data class, in a set of data classes, based on the first encoded value;

in response to accessing a second set of data in a second data stream, classifying the second data stream into a second data class, in the set of data classes, based on the second set of data;

accessing a set of policies comprising:

a first policy associated with the first data class, the first policy defining a first set of target conditions; and a second policy associated with the second data class, the second policy defining a second set of target conditions;

selecting a first communication link, in a set of communication links, as a first active communication link for the first data stream and the second data stream, the first communication link exhibiting a first set of conditions corresponding to the first set of target conditions and the second set of target conditions; and transmitting the first set of data and the second set of data via the first communication link; and during a second time period succeeding the first time period, at the processor:

in response to detecting a difference between the first set of conditions and the first set of target conditions:

selecting a second communication link, in the set of communication links, as a second active communication link for the first data stream, the second communication link exhibiting a second set of conditions corresponding to the first set of target conditions; and transmitting a third set of data in the first data stream via the second communication link, the third set of data comprising a second encoded value representing a second safety state of the emergency stop device; and in response to detecting the first set of conditions corresponding to the second set of target conditions, transmitting a fourth set of data in the second data stream via the first communication link.

* * * * *